Patented Jan. 16, 1940

2,187,334

UNITED STATES PATENT OFFICE 2,187,334

CONDENSATION PRODUCTS OF HIGHER FATTY ACID COMPOUNDS WITH BORIC ACID

Kurt Stickdorn, Rosslau, Anhalt, Germany, assignor to Deutsche Hydrierwerke Aktiengesellschaft, Berlin-Charlottenburg, Germany, a corporation of Germany No Drawing. Application January 15, 1936, Serial No. 59,225. In Germany January 16, 1935

3 Claims. (Cl. 260—398)

The natural and artificial wax-products hitherto in use for commercial purposes consist for the most part of esters of wax-acids with wax-alcohols containing sometimes also, as admixtures, free wax-alcohols and free wax-acids. Among the synthetic waxes the montan wax preparations which in general represent also esters or free acids, have been used with particularly good results. Now, by the fact that it is practicable to make easily synthesized wax-alcohols corresponding to the wax-acids, it has also become possible to obtain from those wax-alcohols other wax-bodies of a new kind and likewise with good properties.

It has been found that with the reaction of boric acid, boric acid-acetic acid or of their anhydrides or also of the analogues of the boric acid such as arsenious and phosphorous acid, upon higher molecular fatty or wax-alcohols such as carnauba wax alcohols, beeswax alcohols, montan wax alcohols, octadecanol, docosanol and others, as well as upon other aliphatic compounds containing hydroxy-groups, such as octadecandiol, hardened castor oil, pentatriacontanol and the like, condensation products are obtained which possess a high melting point, are hard and wax-like and which distinguish themselves mostly by an excellent binding power for turpentine oil or mineral oil and therefore allow of being advantageously used e. g. for the manufacture of shoe creams, floor-waxes, polishing pastes and the like. The thus obtainable condensation products, compared with the wax-alcohols used for the condensation, distinguish themselves by a higher melting point, an enhanced hardness and a remarkably good brightness. Owing to their hardness and their good binding power for oil it is possible to combine them to a large extent with cheap filling means, such as paraffin, ozocerite, hardened rapeseed oil and the like.

The physical character of the condensation products varies according to the selection and amount of the fatty or wax components as well as according to the reaction condition one chooses. We therefore are in a position to make products at will of a more wax-like or a more resin-like character. The latter are obtained particularly when using in the condensation higher temperatures and a longer reaction period or also by substituting to a certain extent resinic acids, resin-alcohols, natural or artificial resins for the organic initial stuffs.

The condensation is performed in such a manner that the initial materials are heated together up to a temperature of above 100° C. It is advantageous to pass a current of an inert gas through the material or to react the same in vacuo. Furthermore, condensing, diluting or filling materials may be added. As inert addition materials, either solid or liquid materials may be used such as decahydronaphthalene, heavy benzene, hardened rapeseed oil, spermaceti, paraffin and in general solvents or diluting agents of any kind.

The new products may be used in the wax-consuming industry e. g. for the manufacture of floor-waxes, shoe creams and polishing pastes of many a kind. Further they may be used for the manufacture of candles with the purpose of raising the melting point or respectively of attaining an opaque appearance and of preventing the dripping. Moreover they are suitable for the making of adhesive greases and adhesive waxes, fats for drawing, for the impregnation of textiles and other materials, as a component of grafting wax, for the manufacture of gramophone records and other plastic or pressed masses, also for the manufacture of glazed paper and the like.

*Example 1*

To 170 weight parts of the wax-alcohol mixture obtainable by the reduction of carnauba wax, 24 parts of crystallized boric acid are added at 160° C. in the course of 2 hours and while stirring and while passing a current of carbonic acid through the mixture, then one continues stirring the reaction product for a further hour and at the same temperature, whereupon one pours it out. The thus obtained light-yellow wax-product begins to liquefy at about 80° C., it is of a brittle hardness and of a good brightness. It may be easily combined—without losing its valuable properties—with equal parts of hardened rapeseed oil and owing to its extraordinarily good oil-binding power it is particularly fit for the manufacture of shoe creams and floor-waxes. Thus a mixture of 10 parts by weight of the aforedescribed light-yellow wax-product, 7 parts of ozocerite, 13 parts of paraffin and 70 parts of turpentine oil represents an excellent solid hard-wax polishing-paste which is most suitable for treating leather goods, polishing masses for furniture and the like.

*Example 2*

60 parts by weight of octadecandiol are (as described in Example 1) condensed with 16 parts of boric acid. The thus obtained product, the melting point of which is about 93° C., is of a good brilliancy, of a pure white and of a remarkable hardness and is particularly suitable as an admixture in the manufacture of paraffin candles.

Example 3

64 parts by weight of a perfectly hardened castor oil (melting point about 78° C.) are heated for 2 hours in a reflux cooler together with a mixture of 11 parts of crystallized boric acid and 55 parts of acetic acid anhydride. After distilling off the volatile portions there remains a mass which will not entirely be melted but at above 100° C. and which may be used as a cast- and impregnating-wax fast to warmth. In performing the condensation in absence of acetic acid anhydride for 40 hours at 180° C. one obtains a product which even at this temperature is no longer really liquid but rather represents a thick and ropy mass which, being no longer soluble in the usual organic solvents, converts after cooling into a brilliant whitish porcelain-like mass that allows of being worked up mechanically and is fit for the manufacture of objects of art and pressed masses.

I claim:

1. The hard-wax-like product of the condensation of hardened castor oil, boric acid and acetic acid anhydride.

2. The hard, wax-like product of the condensation of a hardened castor oil hydroxy compound and a borating acid agent.

3. The hard, wax-like product of the condensation of octadecandiol and boric acid.

KURT STICKDORN.